3,458,506
FLUORESCENT BENZAZOLE COMPOUNDS CONTAINING CYANOVINYLENE GROUPS
Melvin S. Bloom, Rochester, N.Y., and James A. Hill, Dover, Del., assignors to Eastman Kodak Company, Rochester, N.Y., a corporation of New Jersey
No Drawing. Filed Oct. 31, 1967, Ser. No. 679,573
Int. Cl. C09b 23/14, 23/10
U.S. Cl. 210—240         8 Claims

ABSTRACT OF THE DISCLOSURE

Conjugated benzoxazole, benzothiazole, and benzimidazole compounds impart brilliant fluorescent yellow to orange shades to polymeric materials when incorporated therein in minor amounts.

---

This invention relates to certain novel compounds and, more particularly, to novel fluorescent compounds containing cyanovinylene groups and to polymeric materials which have been colored with the fluorescent compounds.

The compounds of the invention have the formula

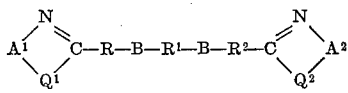

wherein $A^1$ and $A^2$ are the same or different and each represents an o-phenylene group, $Q^1$ and $Q^2$ are the same or different and each represents oxygen, sulfur, or the group —$NR^3$— wherein $R^3$ is hydrogen, lower alkyl or aryl, R and $R^2$ each represents a p-phenylene group or a 2,5-thiophenediyl group, B represents a cyanovinylene group, and $R^1$ represents a vinylene group, a p-phenylene group, a 4,4'-stilbenediyl group, or a 2,5-thiophenediyl group.

As stated hereinbefore, the compounds are useful colorants for synthetic polymeric materials such as films, fibers and other shaped articles. When the compounds are incorporated into or applied to such polymeric materials in minor amounts, they impart brilliant fluorescent yellow to orange shades thereto. When the compounds are so used, they exhibit excellent light stability even when present in the polymeric materials in concentrations as flow as 0.02%.

The phenylene, 4,4'-stilbenediyl and 2,5-thiophenediyl groups represented by $A^1$, $A^2$, R, $R^1$ and $R^2$ can be substituted or unsubstituted. The substituents that can be present on the phenylene or 2,5-thiophenediyl are not important since the primary color of the compounds of the invention is attributable to the conjugation of the compounds in combination with the nitrogen-containing benzoxazolyl, benzothiazolyl, or benzimidazolyl groups.

The substituted phenylene, 4,4'-stilbenediyl, and 2,5-thiophenediyl groups represented by $A^1$, $A^2$, R, $R^1$ and $R^2$ in the above general formula can be further characterized by the formulae

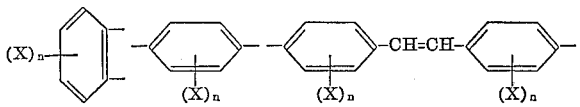

and

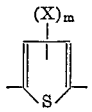

in which each X represents a substituent and $n$ is 1, 2, 3, or 4 and $m$ is 1 or 2. When $n$ is 2, 3, or 4 the substituents represented by X can be the same or different.

Typical monovalent substituents which X can represent include a halogen atom and alkyl, aryl, substituted aryl, hydroxy, alkoxy, aryloxy, acyl, acyloxy, amino, substituted amino, quaternized ammonium, sulfo, substituted sulfonyl, sulfamyl, substituted sulfamyl, cyano, thiocyano, thiol, carbamyl, substituted carbamyl, carbamoyloxy, and nitro groups, for example. The monovalent substituents named are illustrative, and not limitative, because as noted, the monovalent substituents are not important since they do not significantly affect the usefulness of the compounds.

Chlorine, bromine, fluorine and iodine atoms are illustrative of the halogen atoms represented by X. When X is alkyl it preferably has 1 to 18 carbon atoms, such as methyl, ethyl, propyl, isopropyl, n-butyl, isobutyl, n-pentyl, n-hexyl, n-decyl, n-dodecyl, n-hexadecyl, or n-octadecyl, for example. When X is aryl or substituted aryl it is preferably mononuclear aryl such as phenyl, methylphenyl, ethylphenyl, chlorophenyl, bromophenyl, methoxyphenyl, ethoxyphenyl or other substituted phenyl nuclei. However, X can also be an aryl nucleus such as 1-naphthyl or 2-naphthyl and substituted derivatives thereof, or a heterocyclic nucleus such as furyl, thienyl, etc., for example. Illustrative of the alkoxy groups represented by X are alkoxy groups having from 1 to 18 carbon atoms, and preferably from 1 to 4 carbon atoms, such as methoxy, ethoxy, propoxy, isopropoxy, n-butoxy, isobutoxy, n-amoxy, isoamoxy, and hexoxy, for example. Phenoxy and naphthoxy are illustrative aryloxy groups represented by X. Formyl, acetyl, propionyl, butyryl, isobutyryl, benzoyl and naphthoyl, for example, are illustrative of the acyl groups represented by X, Acetoxy, benzoxy, $CH_3CH_2COO$—, $CH_3CH_2CH_2COO$—, and $$CH_3CH_2CH_2CH_2CH_2COO—$$

for example, are illustrative of the acyloxy groups represented by X. Monoalkylamino, dialkylamino, wherein the alkyl groups are the same or different, arylamino, aralkylamino, cycloalkylamino, monohydroxyalkylamino, dihydroxyalkylamino, alkoxyalkylamino and other aliphatic amino groups, for example are illustrative of the substituted amino groups represented by X. Normally, the alkyl, hydroxyalkyl or alkoxyalkyl groups present in such amino groups contain no more than 4 carbon atoms although they can contain more.

Illustrative of the substituted sulfonyl groups represented by X are alkylsulfonyl groups having from 1 to 18 carbon atoms and preferably from 1 to 4 carbon atoms such as methylsulfonyl, ethylsulfonyl, propylsulfonyl, butylsulfonyl, etc., and arylsulfonyl, preferably mononuclear arylsulfonyl such as phenylsulfonyl, methylphenylsulfonyl, chlorophenylsulfonyl, and ethoxyphenylsulfonyl. Illustrative of the substituted sulfamyl groups represented by X are alkyl and dialkylsulfamyl such as N,N-dimethylsulfamyl, N,N-diethylsulfamyl, N,N-dipropylsulfamyl, N-ethylsulfamyl, N-methylsulfamyl, N-butylsulfamyl, and N-ethyl-N-butylsulfamyl; aryl and diarylsulfamyl such as N-phenylsulfamyl, N,N-diphenylsulfamyl, N,N-diethylphenylsulfamyl, N-phenyl-N-ethylphenylsulfamyl, N,N-dibutylphenylsulfamyl and N-ethoxyphenylsulfamyl; N-alkyl-N-arylsulfamyl such as N-ethyl-N-phenylsulfamyl, N-methyl-N-(methoxyphenyl) sulfamyl and N-butyl-N-chlorophenylsulfamyl.

Illustrative of the substituted carbamyl groups represented by X are alkylcarbamyl and dialkylcarbamyl groups wherein the alkyl radicals preferably contain from 1 to 4 carbon atoms, such as N-methylcarbamyl, N-ethylcarbamyl, N-propylcarbamyl, N-isopropylcarbamyl, N-butylcarbamyl, N,N-dimethylcarbamyl, N,N-diethylcarbamyl, N,N-dibutylcarbamyl and N-ethyl-N-methylcarbamyl, aryl and diarylcarbamyl such as N-phenylcarbamyl, N,N-diphenylcarbamyl, N,N-di(ethylphenyl)carbamyl and N,N-di(methoxyphenyl)carbamyl.

X can also be a

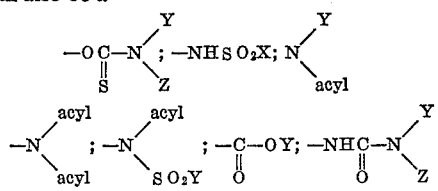

group, for example wherein Y and Z each are a hydrogen atom, an alkyl group (preferably having 1 to 4 carbon atoms), a substituted alkyl group (preferably having no more than 4 carbon atoms), an aryl group (such as phenyl, methylphenyl, ethylphenyl, methoxyphenyl, ethoxyphenyl, chlorophenyl, or bromophenyl, for example) and a cycloalkyl group (such as cyclobutyl, cyclopentyl or cyclohexyl).

The term, acyl, unless otherwise indicated, is used broadly and includes, in addition to acyl groups noted hereinbefore, groups such as the ureido group, $SO_2X$ groups and

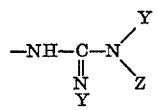

groups, wherein Y and Z have the meaning previously assigned to them.

X can also be a fluorinated alkyl group having 1 to 18 carbon atoms. Difluoroalkyl groups having the formula $—(CH_2)_pCHF_2$ and trifluoroalkyl groups having the formula $—(CH_2)_pCF_3$ wherein $p$ is a whole number from 1 to 17 are illustrative. Higher fluorinated alkyl groups such as $—(CH_2)_{p_1}(CF_2)_p—CF_3$ where $p$ is 1 to 4, for example, and $p_1$ is 1 or 2, can also be present. 2,2-difluoroethyl, 3,3-difluoro-n-propyl, 4,4-difluoro-n-butyl, 5,5-difluoro-n-amyl, 6,6-difluoro-n-hexyl, 2,2,2-trifluoroethyl, 3,3,3-trifluoro-n-propyl, 4,4,4-trifluoro-n-butyl, 5,5,5-trifluoro-n-amyl, 6,6,6-trifluoro-n-hexyl, $—CH_2CH_2CF_3$;

$—CH_2CH_2CF_2CF_3$; $—CH_2CH_2CH_2CF_2CF_3$ and $—CH_2CH_2CF_2CF_2CF_3$ are illustrative of the fluorinated alkyl groups which X can be.

X can also be an unsaturated acylic hydrocarbon radical such as allyl, 1-butenyl, 2-butenyl, 3-butenyl, 1-pentenyl, 2-pentenyl, 3-pentenyl, isobutenyl and 1-isopentenyl, for example.

Typical groups represented in the above general formula as

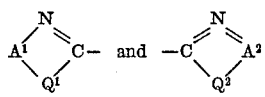

are 2-benzoxazolyl, 5-chloro-2-benzoxazolyl, 5-bromo-2-benzoxazolyl, 5-methyl-2-benzoxazolyl, 6-methoxy-2-benzoxazolyl, 6-methylsulfonyl-2-benzoxazolyl, 6-nitro-2-benzoxazolyl, 6-cyano-2-benzoxazolyl, 6-ethoxycarbonyl-2-benzoxazolyl, 5-methyl-6-acetyl-2-benzoxazolyl, 2-benzothiazolyl, 6-chloro-2-benzothiazolyl, 5-ethyl-2-benzothiazolyl, 6-cyano-2-benzothiazolyl, 6-acetamido-2-benzothiazolyl, 6-methylsulfonyl-2-benzothiazolyl, 6-methylsulfonamido-2-benzothiazolyl, 5-ethoxycarbonyl-2-benzothiazolyl, 5-butyl-2-benzothiazolyl, 6-thiomethyl-2-benzothiazolyl, 2-benzimidazolyl, 1-ethyl-2-benzimidazolyl, 1-phenyl-6-cyano-2-benzimidazolyl, 1-phenyl-5-ethyl-2-benzimidazolyl, 1-butyl-5-nitro-2-benzimidazolyl, etc.

The p-phenylene groups represented by R, $R^1$ and $R^2$ include, for example, 2-nitro-p-phenylene, 2-amino-p-phenylene, 2,5-diamino-p-phenylene, 2,5-dichloro-p-phenylene, 2,5-dibromo-p-phenylene, 2,5-dihydroxy-p-phenylene, 2,5-dimethoxy-p-phenylene, 2,5-dimethyl-p-phenylene, 2-acetamido-p-phenylene, etc.

Illustrative of the 2,5-thiophenediyl groups represented by R, $R^1$ and $R^2$ are 3,4-dichloro-2,5-thiophenediyl, 3,4-dibromo-2,5-thiophenediyl, etc.

The cyanovinylene groups represented by B have both the configurations

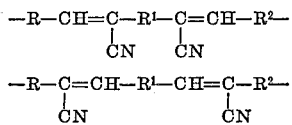

as will be illustrated by the examples below.

Generally, each of the groups represented by $A^1$, $A^2$, R, $R^1$ and $R^2$ will not have more than one substituent, i.e. where $n$ is 1. The unsubstituted or substituted compounds in which $n$ is 1 can be prepared with less expense than the more extensively substituted compounds in addition to exhibiting colors and stabilities equal to the latter.

A particularly preferred group of the compounds of the invention are those in which $A^1$ and $A^2$ each represents o-phenylene or o-phenylene substituted with lower alkyl, e.g. methyl, ethyl, butyl; lower alkoxy, e.g. methoxy, ethoxy; halogen, e.g. chloro, bromo; cyano; or lower alkylsulfonyl, e.g. methylsulfonyl, propylsulfonyl, butylsulfonyl, $Q^1$ and $Q^2$ each represents oxygen; R and $R^2$ each represents p-phenylene; B represents cyanovinylene; and $R^1$ represents vinylene, p-phenylene, or p-phenylene substituted with lower alkyl or lower alkoxy.

The compounds of the invention can be prepared by techniques well known in the art. One method that can be employed is condensing the cyanomethyl compound having the formula

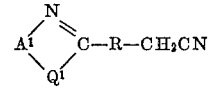

with an aldehyde of the formula $$OHC—R^1—CHO$$

in the presence of an inorganic or organic base and an inert solvent wherein $A^1$, $Q^1$ and R are defined above and $R^1$ is a p-phenylene group, a 4,4'-stilbenediyl group, or a 2,5-thiophenediyl group. Examples of such bases are the hydroxides and carbonates of the alkali metals such as sodium hydroxide, potassium hydroxide, lithium hydroxide and sodium and potassium carbonate. Another method that can be used is the condensation of an aldehyde

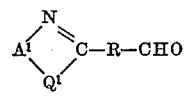

with a cyanomethyl compound having the formula $$NCCH_2—R^1—CH_2CN$$

using a basic catalyst as described above.

Symmetrical compounds wherein $A^1$ and $A^2$, $Q^1$ and $Q^2$, R and $R^2$ are the same are obtained when only one compound of the formula

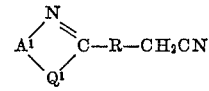

or

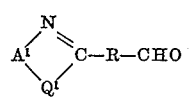

is employed in the condensation reaction described above. Unsymmetrical compounds can be prepared by isolating the intermediate condensation product in the formula

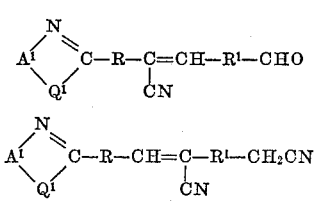

and condensing it with a different compound of the formula

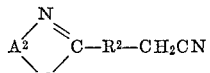

or

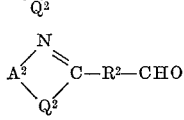

wherein at least one of $A^1$ and $A^2$, $Q^1$ and $Q^2$, or R and $R^2$ are different.

The position of the cyano group on the cyanovinylene group represented by B determines which of the two techniques described above is employed. The cyano group is attached to the vinylene group on the carbon atom adjacent to the groups represented by R and $R^2$ if the first technique is used. If the second method is used, the cyano group is attached to the carbon atom of the vinylene group which is adjacent to the group represented by $R^1$.

The preparation of the intermediates and the compounds of the invention is more fully described and illustrated by the following examples.

Example 1.—Preparation of p-(2-benzoxazolyl) phenylacetonitrile

A solution of 30 g. (0.13 mole) of 2-(p-tolyl) benzoxazole in carbon tetrachloride is treated alternately with 26.7 g. (0.15 mole) of N-bromosuccinimide and 1.5 g. of benzoyl peroxide. The mixture is then refluxed and stirred on a steam bath, then evaporated to dryness. The residue is slurried twice with hot water, then recrystallized from ethanol to obtain 2-(α-bromo-p-tolyl)benzoxazole, M.P. 170–171° C.

Analysis.—Calcd. for $C_{14}H_{10}NOBr$: N, 4.86; Br, 27.74. Found: N, 4.57; Br, 27.39.

A solution of 1.6 g. (0.025 mole) of potassium cyanide in 25 ml. of water is treated with 7.2 g. (0.025 mole) of 2-(α-bromo-p-tolyl)benzoxazole in 100 ml. of ethanol. The mixture is refluxed under nitrogen for several hours. On cooling, the solution deposits 5 g. of p-(2-benzoxazolyl)phenylacetonitrile, M.P. 169–170° C. after recrystallization from ethanol. It has the structure:

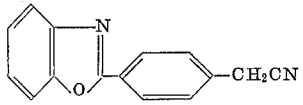

Analysis.—Calcd. for $C_{15}H_{10}N_2O$: C, 76.91; H, 4.30; N, 11.96. Found: C, 77.29; H, 4.61; N, 12.02.

Example 2.—Preparation of p-(5-chloro-2-benzoxazolyl) phenylacetonitrile

One-tenth molar quantities of 4-chloro-2-aminophenol and p-toluic acid are dissolved in 100 g. of polyphosphoric acid, warmed over steam and then heated to 240–250° C. for 4 hrs. The cooled mixture is poured into water, the solid collected and recrystallized from ethanol to obtain 5-chloro-2-(p-tolyl) benzoxazole, M.P. 138–139° C.

Analysis.—Calcd. for $C_{14}H_{10}ClNO$: C, 68.99; H, 4.14; N, 5.75. Found: C, 69.06; H, 4.03; N, 5.30.

5-chloro-2-(p-tolyl)benzoxazole is treated with N-bromosuccinimide and benzoyl peroxide as described in Example 1 to obtain 2-(α-bromo-p-tolyl)-5-chlorobenzoxazole, M.P. 197–198° C. after recrystallization from chlorobenzene.

Analysis.—Calcd. for $C_{14}H_9BrClNO$: C, 52.12; H, 2.82. Found: C, 51.54; H, 2.63.

The above α-bromo compound is converted to p-(5-chloro-2-benzoxazolyl)phenylacetonitrile by the method of Example 1, M.P. 191–192° C. after recrystallization from ethanol. It has the structure:

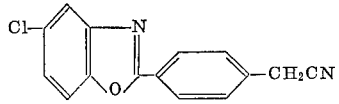

Analysis.—Calcd. for $C_{15}H_9ClN_2O$: C, 67.04; H, 3.38; N, 10.43. Found: C, 67.15; H, 3.50; N, 10.16.

Example 3.—Preparation of p-(6-methoxy-2-benzoxazolyl)phenylacetonitrile 6-methoxy-2-p-tolylbenzoxazole is prepared by reaction of 5-methoxy-2-aminophenol with one mole of p-tolyl chloride in p-dioxane followed by thermal cyclization of the resulting hydroxy-aniline at 300° C. for 3 hr., B.P. 175° C. at 1 mm.

Analysis.—Calcd. for $C_{15}H_{13}NO_2$: C, 75.29; H, 5.47; N, 5.85. Found: C, 75.63; H, 5.58; N, 5.72.

2-(α-bromo-p-tolyl)-6-methoxybenzoxazole is prepared by reaction of the above compound with N-bromosuccinimide and benzoyl peroxide as in Example 1, M.P. 129° C.

p-(6-methoxy-2-benzoxazolyl)phenylacetonitrile is prepared by treating the above α-bromo compound with aqueous-alcoholic potassium cyanide as in Example 1, M.P. 131° C. It has the structure

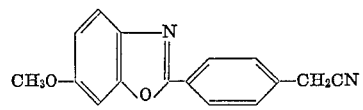

Analysis.—Calcd. for $C_{16}H_{12}N_2O_2$: C, 72.71; H, 4.59. Found: C, 72.39; H, 4.66.

Example 4.—Preparation of p-(6-methylsulfonyl-2-benzoxazolyl)phenylacetonitrile 6-methylsulfonyl-2-(p-tolyl)benzoxazole is made by reaction of 5-methylsulfonyl-2-aminophenol with p-tolyl choride in p-dioxane followed by thermal cyclization at 300° C. for 1.5 hr., M.P. 186° C.

2 - (α - bromo - p - tolyl) - 6 - methylsulfonylbenzoxazole is prepared by bromination of the above with N-bromosuccinimide and benzoyl peroxide as described in Example 1, M.P. 218–220° C. from dioxane-water.

p - (6 - methylsulfonyl - 2 - benzoxazolyl)phenylacetonitrile, M.P. 192–200° C. (from ethanol), is prepared by treating the above α-bromo compound with aqueous-alcoholic potassium cyanide solution. It has the structure:

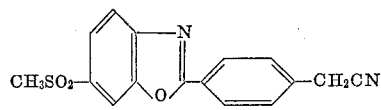

Example 5.—Preparation of p-(2-benzothiazolyl)phenylacetonitrile 2-(p-tolyl)benzothiazole is prepared from o-amino-benzene-thiol and p-toluic acid by the method of Hein et al. [J. Am. Chem. Soc. 79, 427 (1957)].

A solution of 30 g. (0.13 mole) of 2-(p-tolyl) benzothiazole in carbon tetrachloride is treated alternately with 26.7 g. (0.15 mole) of N-bromosuccinimide and 1.5 g. of benzoyl peroxide. The mixture is then refluxed and stirred on a steam bath, then evaporated to dryness. The residue is slurried two times with hot water then recrystallized from ethanol to obtain 2-(α-bromo-p-tolyl)benzothiazole, M.P. 121–125° C.

A solution of 3.0 g. (0.01 mole) of the above α-bromo compound and 0.65 g. (0.01 mole) of potassium cyanide in 50 ml. of 50% aqueous ethanol is refluxed 4 hr. The product is filtered off and after recrystallization from ethanol has M.P. 160–161° C. It has the structure:

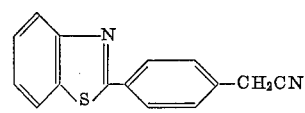

Analysis.—Calcd. for $C_{15}H_{10}N_2S$: C, 71.97; H, 4.03; N, 11.19; S, 12.81. Found: C, 71.95; H, 4.38; N, 10.68; S, 12.91.

Example 6.—Preparation of p-(1-phenyl-2-benzimidazolyl)phenylacetonitrile 1-phenyl-2-p-tolylbenzimidazole is prepared from p-tolualdehyde and N-phenyl-o-phenylenediamine using the conditions described for preparing 2-p-tolylbenzimidazole in U.S. Patent 3,073,841. 1-phenyl-2-p-tolylbenzimidazole is converted to the α-bromo-p-tolyl derivative which is then converted to the corresponding nitrile by the procedure described in Example 1. The product has the formula

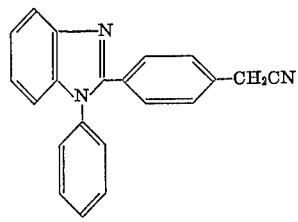

Example 7.—Preparation of 5-(2-benzoxazolyl)-2-thiopheneacetonitrile 2-(5-methyl-2-thienyl)benzoxazole is prepared by the reaction of o-aminophenol and 5-methyl-2-thiophenecarboxylic acid in the presence of boric acid at 220° C., M.P. 87–87.5° C. 2-(5-methyl-2-thienyl)benzoxazole is converted to the α-bromo compound and then to 5-(2-benzoxazolyl)-2-thiopheneacetonitrile by the conditions described in Example 1. The product has the formula

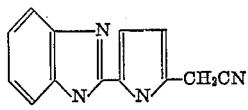

The aldehyde derivatives of the intermediates described above, i.e. the compounds having the formula

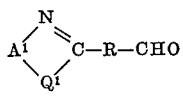

can be obtained by applying the well-known Sommelet reaction to the α-bromo derivatives prepared in the examples above.

Example 8

A solution is made by dissolving 0.47 g. (0.002 mole) of p-(2-benzoxazolyl)phenylacetonitrile and 0.13 g. (0.001 mole) of terephthalaldehyde in 100 ml. of ethanol. Two drops of 50% sodium hydroxide solution are added to catalyze the condensation. A strongly fluorescent yellow precipitate forms immediately which, after 15 min. at room temperature, is removed by filtration yielding 0.6 g. (100% of theory) of crude product. After two recrystallizations from 1-chloronaphthalene the melting point is 421–424° C. The product, α,α'-bis[p-(2-benzoxazolyl)phenyl]-p-benzenediacrylonitrile, has the structure

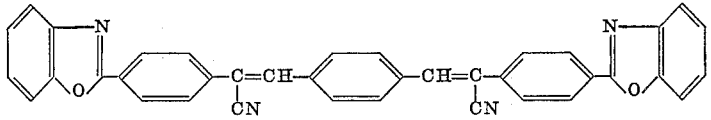

*Analysis.*—Calcd. for $C_{38}H_{22}N_4O_2$: C, 80.55; H, 3.91; N, 9.89. Found: C, 80.34; H, 4.15; N, 10.10.

Example 9

A solution is prepared by warming 0.23 g. (0.001 mole) of p-(2-benzoxazolyl)phenylacetonitrile and 0.1 g. (0.0005 mole) of 2,5-dimethoxyterephthalaldehyde in 150 ml. of ethanol. The solution is cooled to room temperature and 2 drops of 50% sodium hydroxide solution are added causing the immediate formation of a strongly fluorescent red-orange solid. Recrystallization from 1,2,4-trichlorobenzene and then 1-chloronaphthalene gives the product melting at 375–376° C. The product, α,α'-bis[p-(2-benzoxazolyl)phenyl] - 2,5 - dimethoxy - p - benzenediacrylonitrile, has the formula

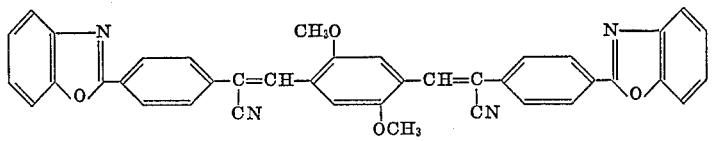

*Analysis.*—Calcd. for $C_{40}H_{26}N_4O_4$: C, 76.66; H, 4.18; N, 8.94. Found: C, 76.37; H, 4.47; N, 8.81.

Example 10

A mixture of 8.92 g. (0.04 mole) of p-(2-benzoxazolyl)-benzaldehyde, 3.12 g. (0.02 mole) of p-benzenediacetonitrile and 3 drops of 50% aqueous sodium hydroxide solution is heated 30 min. in refluxing ethanol. The yellow solid which formed is filtered off, washed with hot ethanol, then recrystallized from 1-chloronaphthalene to obtain the product with M.P. 375–377° C. The product, α,α'-p-phenylebis[p - (2 - benzoxazolyl)cinnamonitrile], has the structure

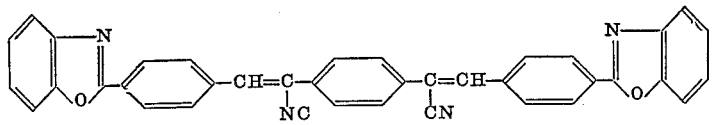

*Analysis.*—Calcd. for $C_{38}H_{22}N_4O_2$: C, 80.54; H, 3.92; N, 9.89. Found: C, 80.35; H, 3.90; N, 9.85.

Example 11

A solution of 8.9 g. (0.04 mole) of p-(2-benzoxazolyl)benzaldehyde and 2.1 g. (0.02 mole) of 1,4-dicyano-2-butene in anhydrous ethanol is treated under nitrogen with 0.23 g. (0.01 mole) of sodium dissolved in anhydrous ethanol. The mixture is stirred overnight at room temperature, then filtered and washed with ethanol. The product, 1,6-bis[p-(2 - benzoxazolyl)phenyl] - 1,3,5 - hexatrien-2,5-dicarbonitrile, is recrystallized from 1,2,4-trichlorobenzene to obtain a yellow solid, M.P. 362° C. It has the structure:

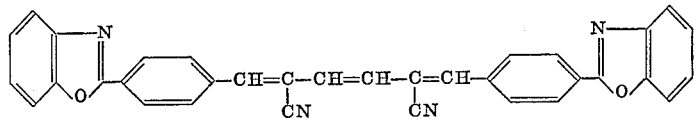

*Analysis.*—Calcd. for $C_{34}H_{20}N_4O_2$: C, 79.05; H, 3.91. Found: C, 79.06; H, 4.23.

Example 12

A mixture of 0.70 g. (0.0026 mole) of p-(5-chloro-2-benzoxazolyl)phenylacetonitrile and 0.17 g. (0.0013 mole)

of terephthalaldehyde in ethanol is condensed as in Example 8 to obtain 0.7 g. of α,α'-bis[p-(5-chloro-2-benzoxazolyl)phenyl]-p-benzenediacrylonitrile, M.P. 435° C. after recrystallization from 1-chloronaphthalene. The product has the structure:

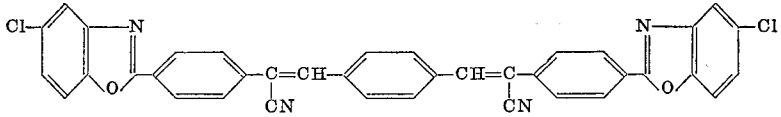

*Analysis.*—Calcd. for $C_{38}H_{20}N_4O_2Cl_2$: C, 71.81; H, 3.18. Found: C, 71.71; H, 3.40.

Example 13

Using the conditions of Example 8, 1.0 g. (0.0038 mole) of p-(6-methoxy-2-benzoxazolyl)phenylacetonitrile and 0.25 g. (0.0019 mole) of terephthalaldehyde are condensed. The condensation products are separated by their solubility difference in hot o-dichlorobenzene. The intermediate condensation product, α'-cyano-4'-(6-methoxy-2-benzoxazolyl)-4-stilbenecarboxaldehyde, is much more soluble than the compound α,α'-bis[p-(6 - methoxy - 2 - benzoxazolyl)phenyl] - p - benzenediacrylonitrile. α'-Cyano - 4' - (6 - methoxy - 2 - benzoxazolyl) - 4 - stilbenecarboxaldehyde, M.P. 252–254° C., is obtained by distillation of the o-dichlorobenzene solution, then recrystallization of the residue from benzene. The product resulting from the complete reaction of the reactants has the structure

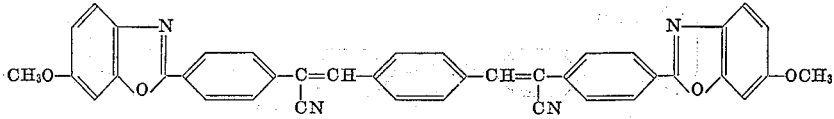

Example 14

The condensation of α'-cyano-4'-(6-methoxy-2-benzoxazolyl)-4-stilbenecarboxaldehyde (Example 13) and p-(6 - methylsulfonyl - 2 - benzoxazolyl)phenylacetonitrile according to the procedure of Example 8, yields the product, α-[p-(6-methoxy-2 - benzoxazolyl)phenyl] - α'-[p-]6-(methylsulfonyl)-2-benzoxazolyl[phenyl] - p - benzenediacrylonitrile, which has the structure

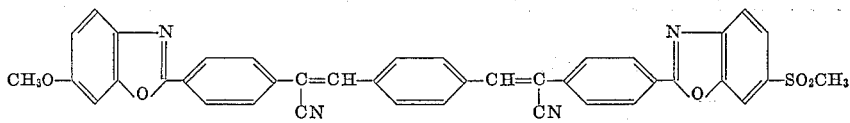

Example 15

A suspension of 0.16 g. (0.0005 mole) of p-(6-methylsolfonyl - 2 - benzoxazolyl)phenylacetonitrile and 0.034 g. (0.00025 mole) of terephthalaldehyde in ethanol is treated with one drop of 50% sodium hydroxide solution and stirred at room temperature for three hours. The yellow precipitate, M.P. 330° C., is washed with ethanol. α,α'-Bis[p-[6-(methylsulfonyl) - 2 - benzoxazolyl]phenyl] - p-benzenediacrylonitrile has the structure:

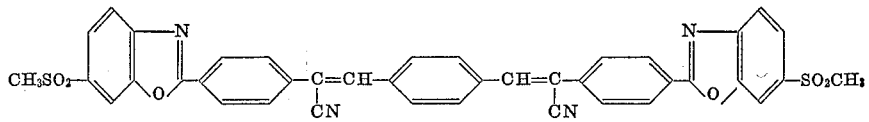

Example 16.—Condensation of p-(2-benzothiazolyl)phenylacetonitrile

Using the conditions of Example 8, 7.5 g. (0.03 mole) of p-(2-benzothiazolyl)phenylacetonitrile and 2.0 g. (0.015 mole) of terephthalaldehyde are condensed to yield 9.0 g. of product. Extraction with hot 1,2,4-trichlorobenzene leaves an orange-yellow solid which is recrystallized from 1-chloronaphthalene to obtain α,α'-bis[p-(2 - benzothiazolyl)phenyl]-p-benzenediacrylonitrile, M.P. 403° C. It has the structure:

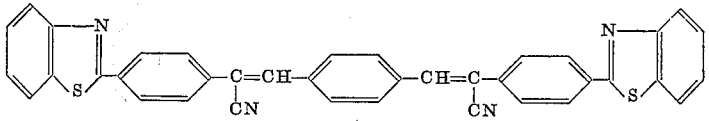

*Analysis.*—Calcd. for $C_{38}H_{22}N_4S_2$: C, 76.22; H, 3.71. Found: C, 76.34; H, 4.07.

4'-(2-benzothiazolyl)-α'-cyano-4-stilbenecarboxaldehyde

The above 1,2,4-trichlorobenzene solution is evaporated to a yellow solid which is recrystallized from benzene to obtain 4'-(2-benzothiazolyl)-α'-cyano - 4 - stilbenecarboxaldehyde, M.P. 215° C., the intermediate condensation product.

*Analysis.*—Calcd. for $C_{23}H_{14}N_2SO$: C, 75.38; H, 3.86; Found: C, 75.18; H, 4.05.

The use of equimolar amounts of substituted phenylacetonitrile and terephthalaldehyde causes 4'-(2 - benzothiazolyl)-α'-cyano - 4 - stilbenecarboxaldehyde to be the major product of the condensation.

Example 17.—Condensing 4'-(2-benzothiazolyl)-α'-cyano-4-stilbenecarboxaldehyde (Example 16) and p-(2 - benzoxazolyl)phenylacetonitrile (Example 1) according to the procedure of Example 8 gives the compound α-[p-(2-benzothiazolyl)phenyl]-α'-[p-(2-benzoxazolyl)phenyl]-p - benzenediacrylonitrile. It has the structure

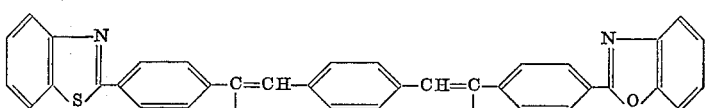

Example 18

A solution of 0.48 g. (0.002 mole) of p-(2-benzothiazolyl)benzaldehyde and 0.16 g. (0.001 mole) of p-benzenediacetonitrile in 100 ml. of ethanol is treated with 2 drops of 50% sodium hydroxide solution and stirred benzoxazolyl)-2-thiopheneacrylonitrile]. It has the structure:

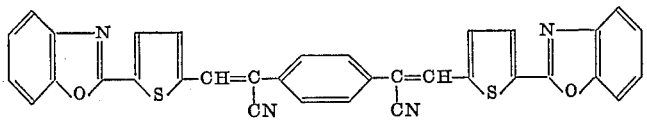

Example 22

According to the method described in Example 8, p-(1-phenyl-2-benzimidazolyl)phenylacetonitrile (Example 6) is reacted with terephthalaldehyde to yield the compound overnight at room temperature. The resulting yellow precipitate is recrystallized twice from 1,2,4-trichlorobenzene, M.P. 355–357° C. The product, α,α′-p-phenylenebis-[p-(2-benzothiazolyl)cinnamonitrile], has the structure:

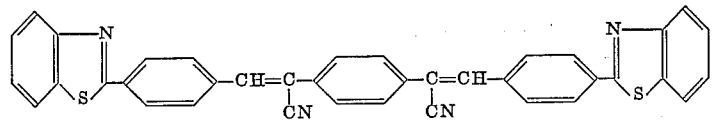

*Analysis.*—Calcd. for $C_{38}H_{22}N_4S_2$: C, 76.21; H, 3.71; S, 10.71. Found: C, 76.20; H, 3.80; S, 10.76.

α,α′-[(1 - phenyl-2-benzimidazolyl)phenyl]-p-benzenediacrylonitrile which has the structure:

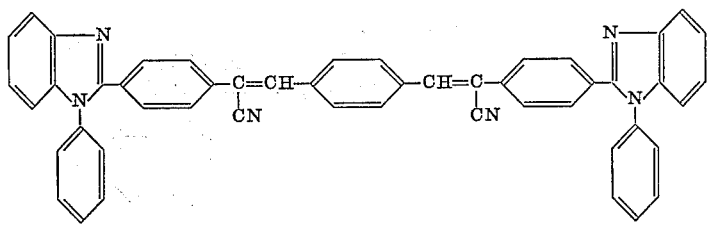

Example 19

Using the condensation conditions of Example 8, p-(2-benzoxazolyl)phenylacetonitrile and 2,5-thiophenedicarboxaldehyde in 2:1 molar amounts yield the compound, α,α′ - bis[p-(2-benzoxazolyl)-phenyl]2,5-thiophenediacrylonitrile, with the structure:

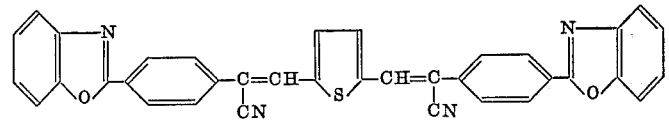

Example 23

The condensation of p-(1-phenyl-2-benzimidazolyl)-benzaldehyde and p-benzenediacetonitrile as described in Example 8 gives the product α,α′-p-phenylenebis[p-(phenyl-2-benzimidazolyl)-cinnamonitrile] having the structure:

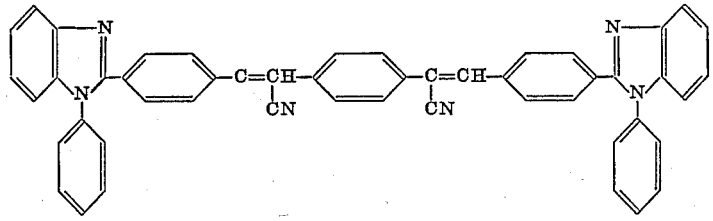

Example 20

The compound, α,α′ - bis[p-(2-benzoxazolyl)phenyl]-3,4-dibromo-2,5-thiophenediacrylonitrile, is prepared by the condensation conditions of Example 8 from 2:1 molar amounts of p-(2-benzoxazolyl)-phenylacetonitrile and 3,4-dibromo-2,5-thiophenedicarboxaldehyde. The product has the structure:

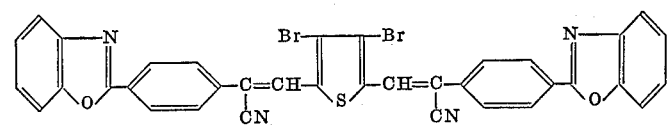

Example 24

Reacting 5-(2-benzoxazolyl) - 2 - thiopheneacetonitrile with terephthalaldehyde as described in Example 8 yields the orange product, α,α′bis[5-(2-benzoxazolyl)-2-thienyl]-p-benzenediacrylonitrile, having the structure:

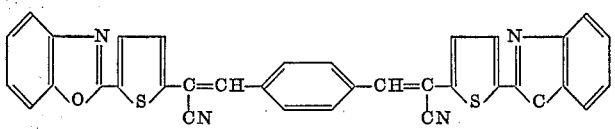

Example 21

This condensation product is obtained using the conditions of Example 8. The condensation of 5-(2-benzoxazolyl)-2-thiophenecarboxaldehyde and p-benzenediacetonitrile give the compound α,α′-p-phenylenebis[5-(2-

Example 25

Under the reaction conditions of Example 8, the reaction of 4,4′-stilbenedicarboxaldehyde, prepared by the method of Drefahl and Plotner [Chem. Ber. 91, 1274–80

(1958)], and p-(2-benzoxazolyl)-phenylacetonitrile yields the compound α,α'-bis[p - (2-benzoxazolyl)phenyl]-4,4'-stilbenediacrylonitrile, an orange solid. It has the structure:

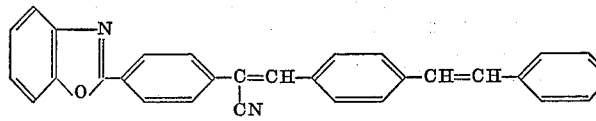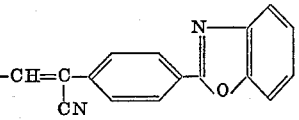

Example 26

The condensation of 4,4' - bis(cyanomethyl)stilbene, prepared from 4,4'-bisbromomethylstilbene [Drefahl and Plotner, Chem. Ber. 91, 1274–80 (1958)] by the method described in Example 1, with p-(2-benzoxazolyl)benzaldehyde yields the compound α,α'-(4,4'-stilbenediyl)bis[p-(2-benzoxazolyl)cinnamonitrile]. The product has the formula

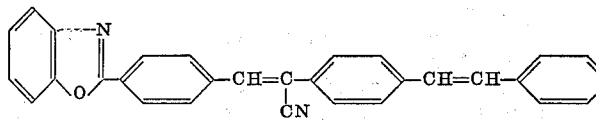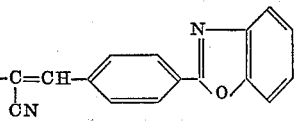

The compounds of the invention are excellent colorants for shaped articles of any of the transparent or translucent, normally solid fiber- and film-forming resins or polymers such as fibers, films, molded articles, etc. The compounds exhibit a strong tinctorial effect upon such polymeric materials at concentrations as low as 0.02%. Even at such low concentrations, the compounds display excellent stability to light. The compounds of the invention also impart to polymeric materials a color which is fluorescent which enhances the brilliance and sheen of the surface of the colored article. Concentrations of the compounds of the invention in polymeric materials of about 0.01% to about 1.0% have been found to give excellent coloration.

Examples of the polymers in which the compounds of the invention can be incorporated to give novel compositions are polyolefins, e.g. polyethylene, polypropylene, polyallomer; polyesters, poly(ethylene terephthalate), poly(1,4-cyclohexylenedimethylene terephthalate), and poly(ethylenenaphthalenedicarboxylic) or modifications of such polyesters; polyesters; polyacrylonitriles containing vinyl chloride, vinylidene chloride and other modifiers such as N-isopropylacrylamide; polyurethanes; rayon; cellulose esters, e.g. cellulose acetate, cellulose triacetate, cellulose propionate, cellulose acetate butyrate; polyamides, e.g., "nylon 66," "nylon 6," "nylon 8," elastomeric polyesters, and other fiber- and film-forming materials. The materials named are merely illustrative and not limitative of the polymeric materials that can be colored with the compounds of the invention.

The compounds of the invention can be incorporated into the polymeric base materials by several techniques. For example, incorporating the compound in the polymer prior to extrusion or spinning, either directly or as a master batch, gives particularly good results as does incorporation during the process of polymer manufacture, such as in the preparation of polyesters.

The polymeric materials can also be colored with the compounds of the invention by dyeing using the heat fixation technique described by T. W. Gibson et al., "Thermosol Method of Dyeing," American Dyestuff Reporter 42, 1 (1953).

The compounds of the invention can also be mixed with a molding powder in a conventional mixer. In the case of certain low melting polymers such as polyolefins, the polymer and color compound can be milled together on hot rolls.

The following examples will serve to illustrate the techniques employed to color various polymeric materials with the compounds of the invention.

Example 27

α,α-Bis[p-(2 - benzoxazolyl)phenyl]-p-benzenediacrylonitrile (0.020 g.) (Example 8) is dry mixed with 100 g. of poly(1,4-cyclohexylenedimethylene terephthalate) polyester granules. The mixture is melted at 310° C. and extruded through a spinnerette in the usual manner. The fibers obtained are a brillant, fluorescent yellow color. The light stability is excellent.

Example 28

Use of poly(ethylene terephthalate) polyester with the same compound under the conditions described in the above example gives brilliant, fluorescent yellow fibers. The depth of dyeing and the light stability are even better than in Example 27.

At 0.06% concentration, the dye confers still deeper and more brilliant coloration in poly(ethylene terephthalate).

Example 29

Using the conditions of Example 27, α,α'-bis[p-(2-benzoxazolyl)phenyl] - 2,5 - dimethoxy-p-benzenediacrylonitrile (Example 9) gives brilliant, fluorescent orange fibers on melt-spinning in poly(ethylene terephthalate). The light stability is excellent.

Example 30

Using the conditions of Example 27, α,α'-p-phenylenebis[p-(2-benzoxazolyl)cinnamonitrile] (Example 10) gives brilliant, fluorescent yellow fibers on melt-spinning in poly(ethylene terephthalate), with excellent light stability.

Example 31

Using the conditions of Example 27, 1,6-bis[p-(2-benzoxazolyl)phenyl] - 1,3,5 - hexatriene - 2,5 - dicarbonitrile (Example 11) gives brilliant, fluorescent yellow fibers on melt-spinning in poly(ethylene terephthalate), with excellent light stability.

Example 32

Melt-spinning α,α'-bis[p-(2 - benzoxazolyl)phenyl]-p-benzenediacrylonitrile (Example 8) at 0.02% concentration in polyamide (nylon 66) sold under the trade name Zytel 101, gives fluorescent yellow fibers.

The following examples illustrate the preparation of films and shaped objects containing the dyes of the invention.

Example 33

α,α'-Bis[p-(2 - benzoxazolyl)phenyl]-p-benzenediacrylonitrile (Example 8) (0.5 g.) is mixed with 100 g. of poly(ethylene terephthalate) and this mixture is then blended with 900 g. of poly(ethylene terephthalate) pellets. The resulting mixture is then extruded as a film at a feeding-zone temperature of 265° C., a melt-zone temperature of 295° C. and a dye temperature of 270° C.

The film is oriented with 200% stretch (drafting and tentering) at 200° F., then heat set at 220° C.

The film, which contains 0.05% concentration of the cyanovinylene compound, is a bright fluorescent yellow.

Example 34

α,α'-Bis[p-(2 - benzoxazolyl)phenyl]-p-benzenediacrylonitrile (Example 8) is solvent dispersed on polyester pellets (molding grade). The solvent is evaporated and shaped objects are injection molded (550° F., 500 p.s.i.) from the dried pellets. Concentrations range from 0.01% to 0.05%. The shaped objects so prepared are clear, yellow fluorescent bodies.

Example 35

Polyethylene chips (100 g.) are dry mixed with 0.02 g. of α,α'-bis[p-(2 - benzoxazolyl)phenyl]-p-benzenediacrylonitrile (Example 8). By injection molding at 180° C. shaped articles are obtained having bright, fluorescent yellow coloration.

Example 36

This example illustrates a method of integrally incorporating the compounds of this invention into polyesters by synthesizing the polyester in the presence of the compound rather than adding the dye to the already formed polyester.

Nineteen and four tenths grams (0.1 mole) of dimethylterephthalate, 28.8 g. (0.02 mole) of 1,4 - cyclohexanedimethanol, 16 drops of a 14.4% solution of $$NaHTi(OC_4H_9)_6$$

in butanol, and 8 mg. of α,α' - bis[p - (2 - benzoxazolyl) phenyl] - p - benzenediacrylonitrile are placed in a flask and heated with stirring to 190–200° C. The ester interchange is rapid and the temperature is rapidly increased to about 270° C. The reaction is then put under reduced pressure (about 1 mm.) and the temperature raised to 300–310° C. over a 1½ hr. period. The viscous reaction mixture is then let down to atmospheric pressure with nitrogen and the resulting polymer is removed. The polymer is a brilliant, fluorescent yellow solid with a crystalline melting point of 290–300° C., inherent viscosity 0.78.

Example 37

A 100% polyester fabric woven from poly(ethylene terephthalate) fibers is dyed with α,α' - bis[p - (2 - benzoxazolyl)phenyl] - p - benzenediacrylonitrile using the heat fixation technique as described in the American Dyestuff Reporter 42, 1 (1953). The dyed fabric is a fluorescent, yellow shade having excellent stability to light.

Example 38

A 50–50 polyester-cotton fabric woven from poly(ethylene terephthalate) and cotton fibers is dyed according to the technique, and with the compound, described in the preceding example. This dyed fabric also is a fluorescent, yellow shade.

The invention has been described in considerable detail with particular reference to certain preferred embodiments thereof, but it will be understood that variations and modifications can be effected within the spirit and scope of the invention as described above and as defined in the appended claims.

We claim:

1. A compound having the formula

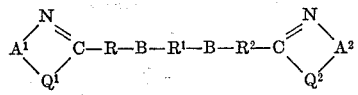

wherein
$A^1$ and $A^2$ each represents o-phenylene or o-phenylene substituted with lower alkyl, lower alkoxy, halogen, cyano, or lower alkylsulfonyl;
$Q^1$ and $Q^2$ each represents oxygen, sulfur, or —$NR^3$— wherein $R^3$ represents hydrogen, lower alkyl or phenyl;
R and $R^2$ each represents p-phenylene or 2,5 - thiophenediyl;
B represents cyanovinylene; and
$R^1$ represents vinylene; p-phenylene; p-phenylene substituted with lower alkyl or lower alkoxy; 2,5-thiophenediyl; 2,5-thiophenediyl substituted with halogen; or 4,4'-stilbenediyl.

2. A compound according to claim 1 wherein
$Q^1$ and $Q^2$ each represents oxygen;
R and $R^2$ each represents p-phenylene; and
$R^1$ represents p-phenylene.

3. A compound according to claim 1 having the formula

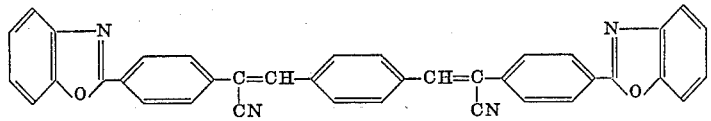

4. A compound according to claim 1 having the formula

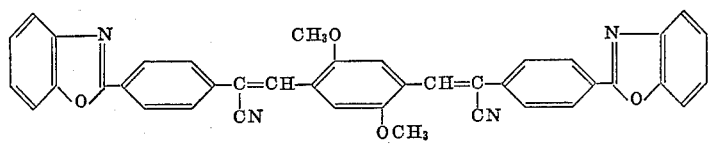

5. A compound according to claim 1 having the formula

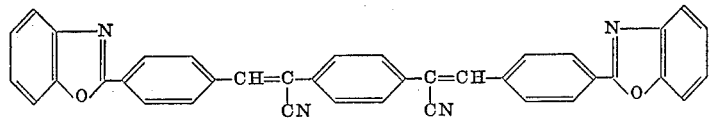

6. A compound according to claim 1 having the formula

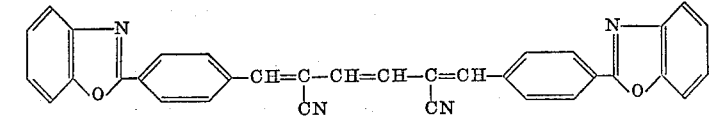

7. A compound according to claim 1 having the formula

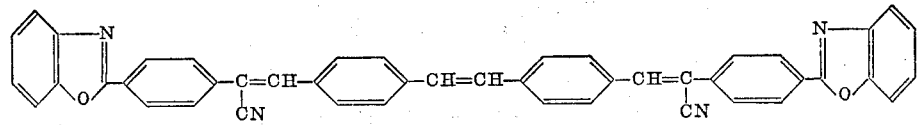

8. A compound according to claim 1 having the formula
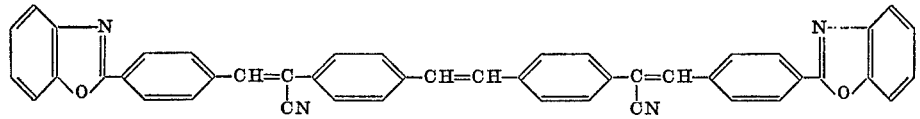
References Cited
UNITED STATES PATENTS
| | | | |
|---|---|---|---|
| 3,177,208 | 4/1965 | Stilz et al. | 260—240 |
| 3,260,715 | 7/1966 | Saunders | 260—240 |
FOREIGN PATENTS
| | | |
|---|---|---|
| 648,674 | 12/1964 | Belgium. |
| 1,378,455 | 10/1964 | France. |
JOHN D. RANDOLPH, Primary Examiner
U.S. Cl. X.R.
106—176; 117—33.5; 252—301.2; 260—37, 304, 307, 309.2, 465